US010496241B2

(12) United States Patent
Smith et al.

(10) Patent No.: US 10,496,241 B2
(45) Date of Patent: Dec. 3, 2019

(54) CLOUD-BASED INTER-APPLICATION INTERCHANGE OF STYLE INFORMATION

(71) Applicant: ADOBE INC., San Jose, CA (US)

(72) Inventors: Michael Smith, San Francisco, CA (US); Sedat Akkus, San Francisco, CA (US); Nayoung Kim, San Francisco, CA (US); Lavanya Raghunath, San Jose, CA (US); Cynthia Kaschub, San Francisco, CA (US); Srinivas Annam, San Jose, CA (US); Mark Shepherd, Tiburon, CA (US); Jacob Surber, Redwood City, CA (US); Glenn Ruehle, Novato, CA (US); Glade Miller, Cedar Hills, UT (US); George Comninos, San Francisco, CA (US); Gavin Peacock, Walnut Creek, CA (US)

(73) Assignee: ADOBE INC., San Jose, CA (US)

( * ) Notice: Subject to any disclaimer, the term of this patent is extended or adjusted under 35 U.S.C. 154(b) by 837 days.

(21) Appl. No.: 14/833,002

(22) Filed: Aug. 21, 2015

(65) Prior Publication Data
US 2017/0052653 A1    Feb. 23, 2017

(51) Int. Cl.
*G06F 3/048*  (2013.01)
*G06F 3/0482*  (2013.01)
(Continued)

(52) U.S. Cl.
CPC ........ *G06F 3/0482* (2013.01); *G06F 3/04842* (2013.01); *G06F 3/04845* (2013.01); *G06F 17/211* (2013.01)

(58) Field of Classification Search
CPC ......... G06F 3/0481; G06F 9/4446; G06F 8/65
See application file for complete search history.

(56) References Cited

U.S. PATENT DOCUMENTS 5,999,190 A   12/1999  Sheasby et al.
6,504,554 B1   1/2003  Stone et al.
(Continued)

OTHER PUBLICATIONS

Paul Boger, "Adobe InDesign CC on Demand", Jun. 2013, Perspection, p. 1-42. "Indesign2013.pdf".*
(Continued)

*Primary Examiner* — Haoshian Shih
(74) *Attorney, Agent, or Firm* — Shook, Hardy and Bacon L.L.P.

(57) ABSTRACT

Techniques for sharing style information between different applications and/or devices are provided. A document is displayed in a first window of a first application. The document includes user-selectable portions that each comprises at least one style information item. A menu is displayed in a second window. The menu provides a mechanism to store at least one style information item from the user-selectable portions. In response to a user selecting a user-selectable portion, menu options are provided in the menu to store at least one style information item for the selected user-selectable portion. The menu options are determined based on the style information item corresponding to the selected user-selectable portion. In response to the user selecting a menu option, the style information item corresponding to the selected menu option is stored.

20 Claims, 5 Drawing Sheets

(51) Int. Cl.
*G06F 3/0484* (2013.01)
*G06F 17/21* (2006.01)

(56) References Cited

U.S. PATENT DOCUMENTS

| | | | |
|---|---|---|---|
| 7,213,035 B2 | 5/2007 | Ornstein et al. | |
| 7,386,789 B2 | 6/2008 | Chao et al. | |
| 7,447,713 B1 | 11/2008 | Berkheimer | |
| 7,636,792 B1 | 1/2009 | Ho | |
| 7,921,370 B1* | 4/2011 | Legault | G06F 9/4446 715/711 |
| 8,484,553 B2 | 7/2013 | Lloyd et al. | |
| 8,510,100 B2 | 8/2013 | Glass et al. | |
| 9,282,168 B2 | 3/2016 | Prahlad | |
| 9,332,233 B2 | 5/2016 | Yanagidate | |
| 9,411,790 B2 | 8/2016 | McKinney et al. | |
| 9,626,080 B1 | 4/2017 | Labaj et al. | |
| 9,632,851 B1 | 4/2017 | Johansson et al. | |
| 2005/0132284 A1 | 6/2005 | Lloyd et al. | |
| 2006/0047718 A1 | 3/2006 | Keith et al. | |
| 2006/0288015 A1 | 12/2006 | Schirripa et al. | |
| 2007/0061743 A1 | 3/2007 | Golbandi | |
| 2007/0061351 A1 | 10/2007 | Villaron et al. | |
| 2007/0239833 A1 | 10/2007 | Alperin et al. | |
| 2007/0294366 A1 | 12/2007 | Ozzie et al. | |
| 2008/0005150 A1 | 1/2008 | Gupta et al. | |
| 2008/0052704 A1* | 2/2008 | Wysocki | G06F 8/65 717/173 |
| 2008/0263070 A1 | 10/2008 | Villaron et al. | |
| 2010/0070594 A1 | 3/2010 | Yoshimura | |
| 2010/0208104 A1 | 8/2010 | Imagawa et al. | |
| 2010/0318898 A1 | 12/2010 | Rees et al. | |
| 2010/0325086 A1 | 12/2010 | Skinner et al. | |
| 2011/0093565 A1 | 4/2011 | Bacus et al. | |
| 2012/0066601 A1 | 3/2012 | Lazula et al. | |
| 2012/0192046 A1 | 7/2012 | Slatter et al. | |
| 2013/0117319 A1 | 5/2013 | Soltani et al. | |
| 2013/0184845 A1 | 7/2013 | Hales | |
| 2013/0185339 A1 | 7/2013 | Clay et al. | |
| 2013/0282720 A1 | 10/2013 | Baker et al. | |
| 2014/0164315 A1 | 6/2014 | Golshan | |
| 2014/0282398 A1 | 9/2014 | Podolyak et al. | |
| 2014/0337321 A1 | 11/2014 | Coyote et al. | |
| 2015/0143210 A1 | 5/2015 | Lam | |
| 2015/0180938 A1 | 6/2015 | Ruppin et al. | |
| 2015/0249848 A1 | 9/2015 | Holman | |
| 2015/0339268 A1 | 11/2015 | Bednarz, Jr. et al. | |
| 2016/0098250 A1 | 4/2016 | Gross et al. | |
| 2016/0132301 A1 | 5/2016 | Riscutia et al. | |
| 2016/0283475 A1 | 9/2016 | Panchapakesan | |
| 2017/0054831 A1 | 2/2017 | Smith et al. | |

OTHER PUBLICATIONS

Non-Final Office Action dated Jul. 2, 2018 in U.S. Appl. No. 14/833,006, 12 pages.

Notice of Allowance dated Jun. 24, 2019 in U.S. Appl. No. 14/833,006, 9 pages.

* cited by examiner

US 10,496,241 B2

CLOUD-BASED INTER-APPLICATION INTERCHANGE OF STYLE INFORMATION

BACKGROUND

Different applications may be used as part of a user's regular workflow since each application provides different functionality to the user. Thus, when producing content, the user may use multiple applications during the production of the content. A user may also use multiple devices during the production of content. In such cases, a user may wish to share data and/or information, e.g., style information, among the different applications and devices.

Various solutions have been provided to share style information among applications and devices. For example, an application may use a style sheet, such as cascading style sheet (CSS), to incorporate style information into a file. However, if a user wishes to store new style information in the style sheet, the user has to understand how to store the style information and how to modify the style sheet with that information. Furthermore, it may be difficult to extract the style information from a document in a format that is usable by another application or device. For example, color scheme information may not be easily transferable between applications since it may be embedded as part of a larger custom data format (e.g. colors stored in a PSD (Photoshop document) file).

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention are concerned with storing and interchanging style information between multiple applications and devices. This provides a user with the ability to easily extract style information from documents and reuse the style information with multiple applications and devices. In some embodiments described herein, a user interface is provided that allows a user to select a portion of a document containing style information. The user interface also provides a library that includes menu options for extracting the style information. For instance, the library may provide menu buttons for different types of style information to be captured. In response to the user selecting one of the menu options after selecting a portion of the document, the library determines appropriate characteristics of the style information and stores the style information. The style information is then available to be used in another application and/or device.

BRIEF DESCRIPTION OF THE DRAWINGS

The present invention is described in detail below with reference to the attached drawing figures, wherein.

DETAILED DESCRIPTION

Figure 1:
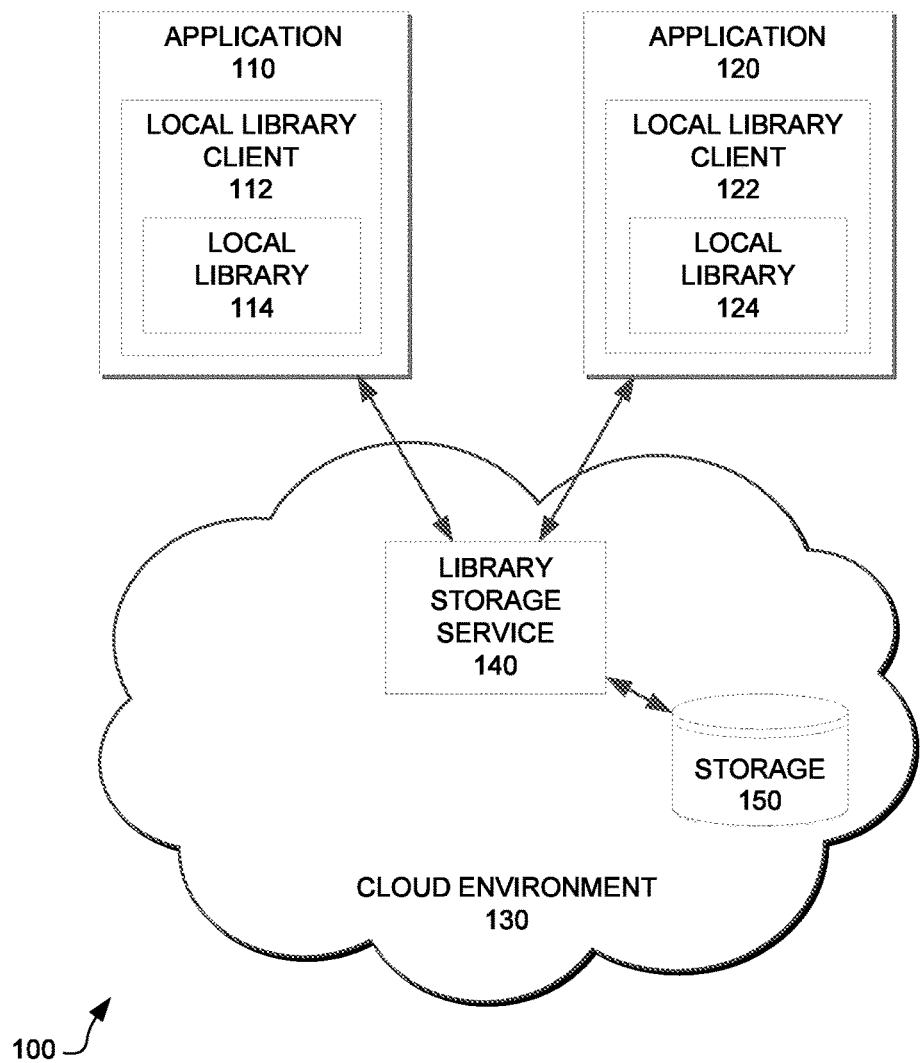
FIG. 1 is a block diagram illustrating an exemplary system for storage and interchange of style information in accordance with implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied where one or more features are present. Also, the term "or" includes the conjunctive, the disjunctive and both (a or b thus includes either a or b, as well as a and b) unless otherwise indicated to the contrary.

A "design element" is defined herein as an element of a document that defines a property or component embedded in the document. For example, a property can be a color, color theme, font, text style, layout, special effect, brush, or layer style that is used as part of the design of the document. A component can be a graphic or text embedded in the document. A component can also be a file that can be incorporated into a document. A design element can be displayed in a library as a single library item with references to multiple stored representations.

"Style information" is a type of design element that defines a property embedded in the document. For example, the property may be a color, color theme, font, text style, layout, special effect, brush, or layer style that is embedded in the document.

A "representation" is defined herein as a storage component of a design element. For example, if a design element is a color, the representations can be RGB, CMY(K), HSL, YUV, YCbCr, and YPbPr representations of the color. The representations can be located in a single document or in separate documents.

A "library" is defined herein as a compilation of design elements. A "centrally stored library" is defined herein as a library that is stored in a "library storage service," which may be provided by a server, for instance, in a cloud computing environment. A centrally stored library is not specific to an application and may include design elements from multiple applications. The library storage service maintains the centrally stored library, which stores the design elements and representations that are available for the applications and devices. The library storage service also provides interfaces to local library clients to synchronize the contents of local libraries with the centrally stored library. A "local library" is defined herein as a library that is specific to an application on a device. A local library client (also referred to as a "library client") refers to the interface in an application for accessing the local library specific to the application. Multiple local libraries may exist on a device, where each local library is specific to an application on the device and is accessed via a library client.

A "complementary storage format" is defined herein as a storage format that can represent the same or similar data of another storage format. Thus, for some applications, style information in a complementary storage format can be substituted for the original style information. For example, complementary storage formats for RGB can include CMY(K), HSL, YUV, YCbCr, and YPbPr, among others.

A "style information item" refers to a particular item of style information. While a portion of a document can have a variety of style information associated with it, each item of style information can be obtained and referenced separately. For example, a portion of a document may correspond to a character style and color, each of the character style and color being a style information item. A portion of the document may be a layer.

A "user-selectable portion" refers to a predetermined portion of a document that has style information associated with that portion. For example, a user may click (via a mouse or other pointing device) on a location of a document. A selection outline corresponding to a user-selectable portion may appear on an area of the document associated with the location. For example, a selection outline appears around a graphic on a document if the user clicks on any location of a graphic. It should be understood that other means of selecting a portion of a document can be provided. For example, a user can click and drag a mouse over an area of the document. The area that the user dragged the mouse over may be a user-selectable portion. For example, if the user wishes to select text, the mouse can be dragged over the portion of the text the user wishes to select. Any portion of the document that has style information can be a user-selectable portion. For example, the background of a document can be selected in order to obtain style information of the background, e.g., its color.

Applications use style information as a way for users to produce documents faster and to ensure consistency between documents. However, sharing this style information presents a challenge when the style information comes from another application and/or device. A user may wish to share style information among different applications and devices. When the style information is a style embedded in a document, it may be difficult to isolate this data in a form that can be transferred and used by another application or device. Furthermore, it may be difficult or impossible to share this style information if the other application or device cannot understand or use the original format of the style information. In addition, the user may wish to share a library (and by extension, style information) with other users. However, it may be difficult for other users to discover and use the style information without providing an interface to interact with the style information.

Embodiments of the present invention are directed to storing and interchanging style information between multiple applications and devices. This provides a user with the ability to reuse style information without having to create multiple versions of the style information that are compatible with the multiple application and devices. In some embodiments described herein, style information is received from a first application and stored in a centrally stored library. For example, a document is displayed in a first window of a first application. The document includes a number of user-selectable portions that each includes at least one style information item. A menu is displayed in a second window. The menu provides a mechanism to store the style information item from user-selectable portions. In response to a user selecting a user-selectable portion, menu options are provided in the menu to store at least one style information item for the selected user-selectable portion. The menu options are determined based on the style information corresponding to the selected user-selectable portion. In response to the user selecting a menu option, the style information item corresponding to the selected menu option is stored. The style information item can be stored in a local library and/or a centrally stored library.

By providing a mechanism to extract and store style information, a user can easily extract style information from a document and reuse or share that style information. The user need not know anything about the properties of the style information, and can be assured that the properties of the style information for the portion of the document they are extracting will be maintained in the library. For example, the user need not know the values for a color, and can just select the color from the document to be stored. Furthermore, the user can reuse or share the style information without having to modify or newly create the style information. The user can share the style information, e.g., by sharing a library, with other users providing them with the capability of using the style information without having to modify or newly create the style information. This allows users to easily extract and share style information, allowing for a collaborative environment for the sharing of style information.

FIG. 1 is a block diagram illustrating an exemplary system for storage and interchange of style information in accordance with implementations of the present disclosure. A system for storage and interchange of style information 100 includes applications 110, 120 and a cloud environment 130. Although a cloud environment 130 is described, it should be understood that the system 100 may also be located on a single user device or multiple user devices. It should also be understood that applications 110, 120 may also be part of the cloud environment 130, e.g., web-based applications, and are shown as being separate from the cloud environment 130 for illustrative purposes only. Alternatively, the applications 110, 120 may exist on a user device or may be retrieved, e.g., downloaded, to a user device from the cloud environment 130. Applications 110, 120 may be on the same user device or different user devices.

Applications 110, 120 are configured to display a document containing information relating to the styles used in the document. For example, the text of the document may have corresponding data regarding the font type, font size, font effects, etc. that describe the character style of the text. The text of the document may have other corresponding data, such as color. This corresponding data can be invisible to the user. For example, a user need not know the font type or font size. In some embodiments, the user may know some of the properties of the text, such as font type or font size, but other properties may be hidden (such as spacing). Applications 110, 120 also display a menu for storing style information from the document. For example, menu buttons may be provided to store different style types.

Applications 110, 120 include local libraries clients 112, 122, respectively. Local library clients 112, 122 may be incorporated as part of applications 110, 120, or may be retrieved from the cloud environment 130 upon, e.g., using applications 110, 120. Local library clients 112, 122 may each store local libraries 114, 124, respectively, which contain representations of style information, on the user device. Alternatively, local library clients 112, 122 may retrieve at least one representation of the style information from the cloud environment 130 when the design element is selected. Local library clients 112, 122 display the style information as a single design element while storing multiple representations of the style information. A user need not know how the representations are being stored, and can just be aware that the style information is usable in applications 110, 120.

Local library clients 112, 122 display different types of style information. For example, style types being displayed in local library clients 112, 122 may include font and color information. Thus, local library clients 112, 122 can display both style types, even if the method of storing the multiple representations differs. In some embodiments, the multiple representations may include a primary representation and one or more complementary representations. For example, the primary representation may be the originally received representation of the style information. Alternatively, the primary representation may be a representation with the highest fidelity, e.g., the representation with the most detail. The complementary representations may be representations that are compatible with the style type. For example, a color may be represented by RGB, CMY(K), HSL, YUV, YCbCr, and YPbPr style representations.

Local library clients 112, 122 are connected, e.g., via a network, to a library storage service 140. Although the library storage service 140 is located in the cloud environment 130 in FIG. 1, a library storage service may be located in other locations in other configurations. For instance, the library storage service 140 may be located on the same user device as applications 110, 120 and may be connected to applications 110, 120 via communication channels of the user device. The library storage service 140 stores a centrally stored library that includes the style information available to applications 110, 120. The centrally stored library is not limited to style information available to applications 110, 120, and may include any style information available to any application. Alternatively, a centrally stored library may include any style information available to a particular user. Thus, the centrally stored library may include style information not found in local libraries 114, 124.

The library storage service 140 is connected to storage 150. The storage 150 may also be located on the cloud environment 130 or on a user device. The storage 150 can store a portion of the representations of the centrally stored library. For example, the multiple representations of style information may be stored as files. The storage 150 may store the files, and the library storage service 140 may point to files on the storage 150. Thus, when style information is selected from the library storage service 140 (or local library clients 112, 122), the file may be accessed from the storage 150. It should be understood, that each of the local library clients 112, 122 may have a local storage, where the local storage is retrieved from the storage 150. For example, the local storage may contain representations of style information available to applications 110, 120, respectively.

The library data may also be stored in the library storage service 140 or in a different storage, i.e., storage 150. The library data can be stored as a file, on the cloud environment 130, along with the representations of the style information. Metadata about the library (e.g., who it belongs to, access control, etc.), can be stored in a database.

Having described various aspects of the system for storage and interchange of style information 100, it is noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are exemplary in nature and in number and are not to be construed as limiting for all implementations of the present disclosure. It should be understood that this and other arrangements described herein are set forth only as examples. Other arrangements and elements (e.g., machines, interfaces, functions, orders, and grouping of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 2:
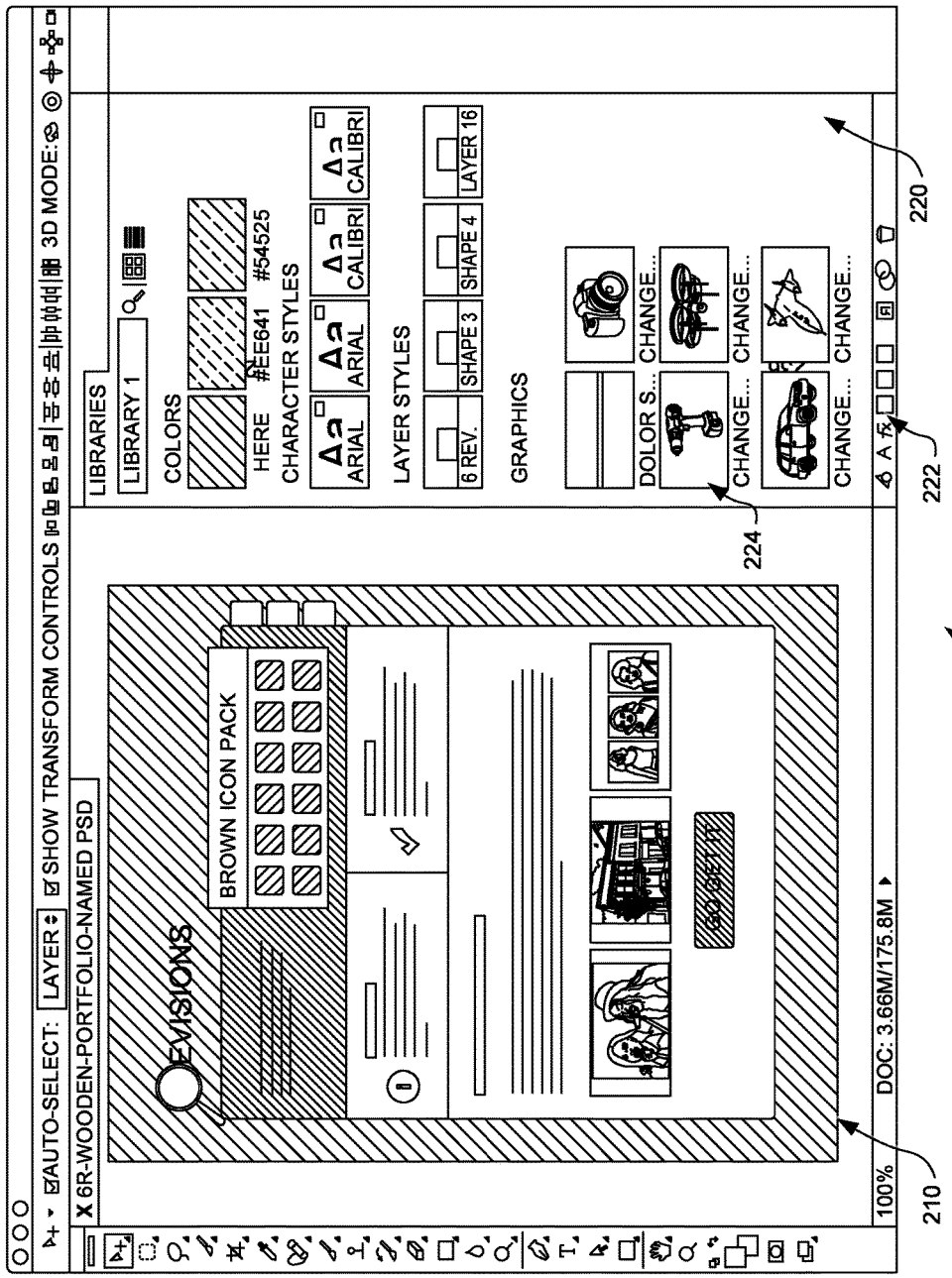
FIG. 2 is a diagram illustrating an exemplary user interface for storage and interchange of style information in accordance with implementations of the present disclosure.

FIG. 2 is a diagram illustrating an exemplary user interface for storage and interchange of style information in accordance with implementations of the present disclosure. Referring to FIG. 2, an application provides a user interface 200. The user interface 200 includes a first window 210 for displaying a document and a second window 220 for displaying a library in a local library client. The second window 220 includes a menu area 222 and a library viewing area 224. The menu area 222 provides menu options for the user to store style information. For example, the menu area may have menu items for character style, layer style, and color. Thus, the user, upon selecting a portion of the document, can select one of the menu items to store style information for the selected portion of the document. Each menu item can store a different type of style information or may store the same type of style information but a different aspect of the style information. For example, if a portion of a document has three colors associated with it, three menu items (one for each color) may be provided for the user to store the style information. The library viewing area 224 provides a display of available style information that the user can incorporate into the document. For example, FIG. 2 displays style information for colors, character styles, layer styles, and graphics. It should be understood that this list is illustrative and many other types of style information may also be stored in the library. A user can select a style information representation from the library viewing area and incorporate it into the document. For example, if a portion of the document is selected, the user can select one of the style information representations, e.g., a color. Once selected, the selected portion of the document is modified with the style information representation. Furthermore, it should be understood that the library viewing area 224 is described as part of the application for illustrative purposes only. In some embodiments, the library viewing area 224 may be in a separate application. In addition, in some embodiments, the library viewing area 224 may be displayed, e.g., in a separate floating window.

In some embodiments, the style information may be stored in the centrally stored library as a single representation. For example, if the original style information is a RGB representation, the library storage service may store the style information in the centrally stored library as an RGB representation. If an application wanting to use the style information cannot understand the RGB format, the server can generate a representation that is understandable by the application. For example, if an application cannot understand a RGB representation, but understands an HSL representation, the library storage service may generate a HSL representation of the style information, which can be downloaded and cached in a local library usable by the application. In some embodiments, the library storage service may determine the highest fidelity format understandable by the application, and generate a representation of the style information in the highest fidelity format.

In some embodiments, an application on the user device may generate a representation that is understandable by the application. For example, a color may be stored in the centrally stored library as a single representation, e.g., RGB. If the application uses a different format, e.g., HSL, the application (via a local library client) can take the RGB representation and generate a HSL representation from the RGB representation. Generation of a new representation is hidden from the user, since only the color style information is displayed in the local library client. In some embodiments, for style information that may not be easily translated (i.e., a new representation is generated from a previously stored representation), multiple representations can be stored for that style information.

Figure 3:
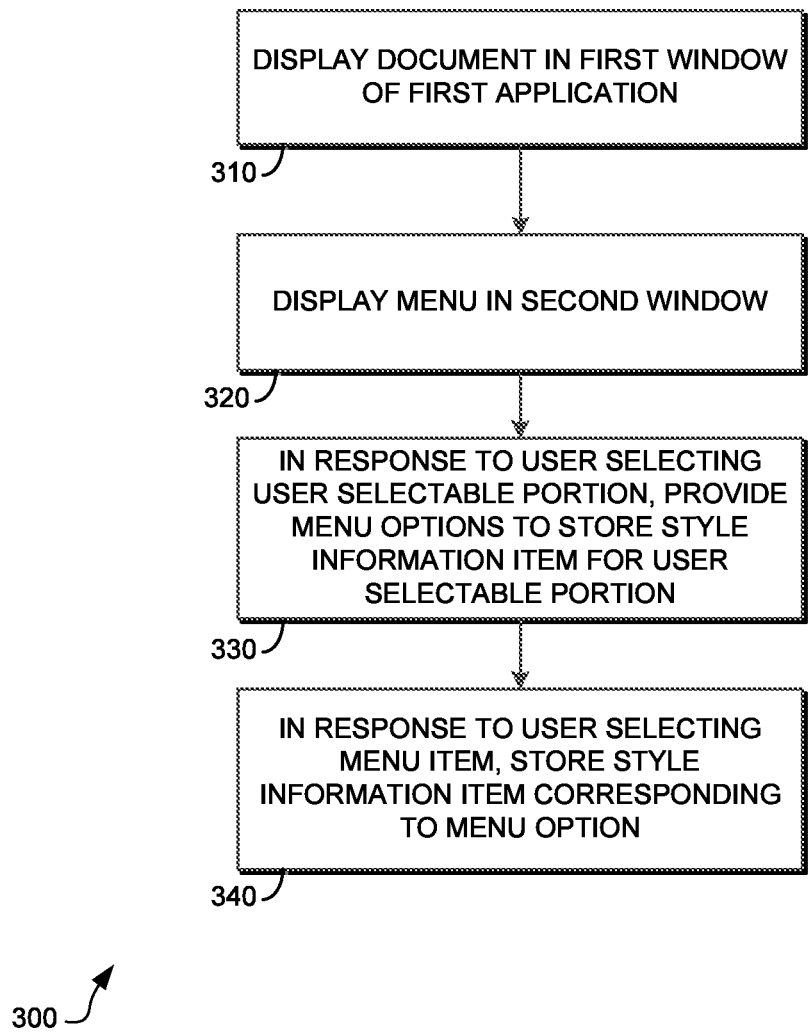
FIG. 3 is a flow diagram illustrating a method for storage and interchange of style information in accordance with implementations of the present disclosure.

Turning now to FIG. 3, a method 300 for storage and interchange of style information is shown, in accordance with implementations of the present disclosure. Method 300 may be performed on one or more servers in a data center or across multiple data centers.

At block 310, a document is displayed in a first window of a first application. The document includes various user-selectable portions. Each user-selectable portion includes at least one style information item. For example, a block of text may be selectable. The block of text may contain style information such as character type, color, text effects, or other style information. The selectable portion can be determined by the first application. For example, the first application may use layers, where each layer corresponds to a portion of the document. Thus, the user may select the layer, and be provided a mechanism to capture the various style information in that layer.

At block 320, a menu is displayed in a second window. The menu provides a mechanism to store style information items from the user-selectable portions. In some instances, buttons are provided for the user to store style information. For example, a character style and color button may be provided. It should be understood that various other buttons may be provided in the menu to capture different types of style information. Furthermore, it should be understood that buttons can be provided to store different style information of the same style type. For example, if a portion of the document has multiple colors associated with the portion, multiple buttons can be provided, each button corresponding to a color.

At block 330, in response to a user selecting a user-selectable portion, menu options are provided in the menu to store at least one style information item for the selected user-selectable portion. The menu options are determined based on the style information corresponding to the selected user-selectable portion. For example, if a block of text is selected in the document, menu options for character type, color, and text effects can be provided. If an image is selected in the document, menu options for the image and image effect can be provided.

At block 340, in response to the user selecting one of the menu options, the style information item corresponding to the selected menu option is stored. The style information item can be stored in a local library of the first application. Furthermore, the style information item can be stored in a centrally stored library, the centrally stored library being shared between multiple applications and/or devices. In some embodiments, a style type is determined for the style information item. The style information item is stored as multiple representations in the centrally stored library, where the multiple representations correspond to one or more variations of the style type.

In some embodiments, a user-selectable portion may not have a style information item corresponding to one of the menu options. For example, a graphic may not have a corresponding character style type. Thus, when a user-selectable portion does not have a style information item corresponding to one of the menu options, the menu option can be obscured or removed. For example, the menu option can be greyed out in the menu or not visible in the window.

In some embodiments, when a user selects another user-selectable portion, the menu options in the menu are changed to correspond with the style information items corresponding to the newly selected user-selectable portion. For example, if a block of text is selected, menu options for the block of text are displayed. However, if a graphic is selected, the menu options in the menu change to correspond to the graphic. Thus, those menu options that correspond to style information items corresponding to the currently selected user-selectable portion are displayed.

In some embodiments, a local library client is also displayed in the second window. Style information items can be displayed in the local library client (e.g., via the second window in the user interface), where the style information items are part of a local library. The user can apply those style information items to portions of the document (in the first window). For example, the local library can store color style information. Thus, color style information items can be applied to the document in the first window. When a new style information item is stored in the local library, i.e., a menu option is selected for a portion of the document, the style information item can simultaneously be displayed in the local library client (e.g., via the second window in the user interface). The local library can include color, character style, layer style, and graphic style types. The local library can be one of a plurality of selectable libraries of style information items available to the user. Thus, in some embodiments, the user can switch between libraries on the library client. The local library client displays an example of the style information items. For example, a character style can be displayed in the local library client as a box containing sample text applying the character style. For a user wanting to apply the character style to a portion of the document, the user can select the box containing the sample text to apply the character style to the portion of the document. Thus, the user can visually determine the style information item without having to determine the properties of the style information item.

In some embodiments, the stored style information item can be displayed in a local library client of a second application. For example, when the user stores a new style information item, the style information item can be simultaneously available in a local library of the second application. In response to the user selecting the stored style information item, the stored style information item can be applied to at least a portion of a document in the second application. In some embodiments, the stored style information item may not be compatible with the second application. Thus, a representation of the stored style information item that is compatible with the second application can be provided. The user can thus apply the representation of the stored style information item to at least a portion of a document in the second application. In some embodiments, when the stored style information item is not compatible with a second application, the stored style information item can be obscured in a local library client of the second application. For example, the local library may receive style information for a layer style type. If the second application cannot understand the layer style type, it may be obscured, e.g., greyed out. Thus, the user may know that the style information item is stored in the local library, but unavailable for use since the style type is not compatible with the application.

Figure 4:
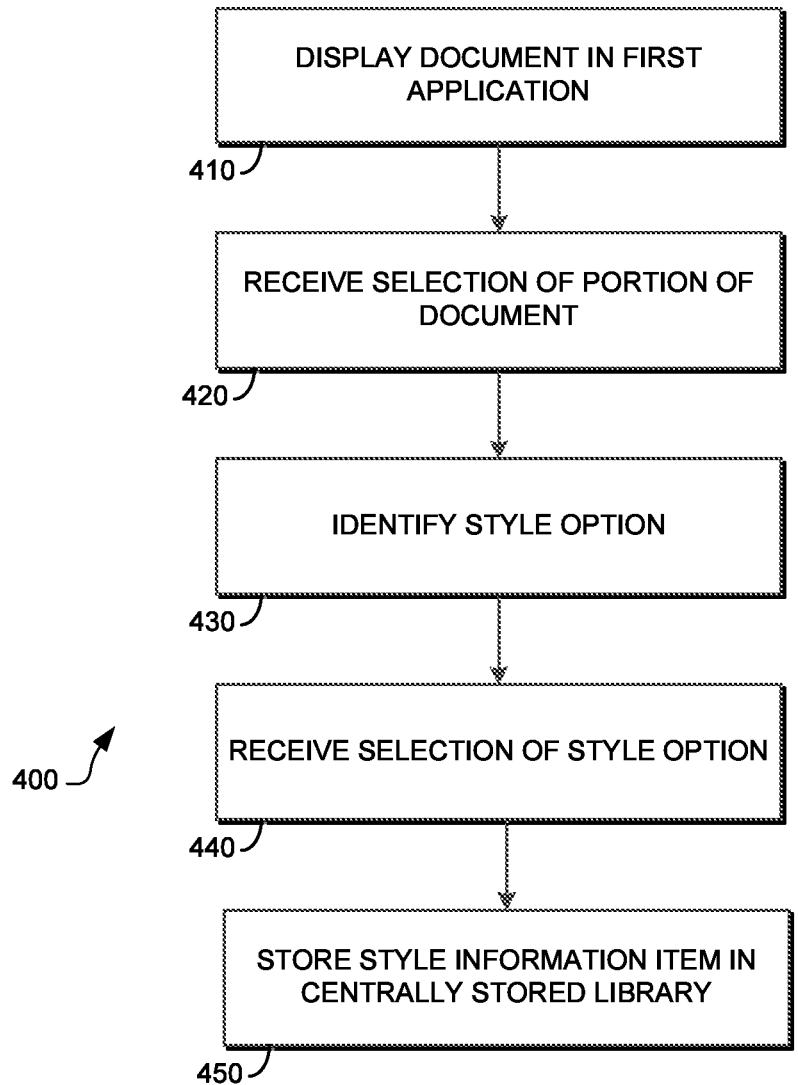
FIG. 4 is a flow diagram illustrating another method for storage and interchange of style information in accordance with implementations of the present disclosure.

Turning now to FIG. 4, another method 400 for the storage and interchange of style information is shown, in accordance with implementations of the present disclosure. Method 400 may be performed on one or more servers in a data center or across multiple data centers.

At block 410, a document is displayed in a first application. The document can be any type of document that is supported by the first application. For example, the document can be a PSD file.

At block 420, a selection of a portion of the document can be received. The document can include a plurality of selectable portions of the document, where each selectable portion of the document comprises at least one style information item. For example, a block of text may be selected. The block of text may contain style information such as character type, color, text effects, or other style information. The portion can be determined by the first application. For example, the first application may use layers, e.g., layers of a PSD file, where each layer corresponds to a portion of the document. Thus, the user may select the layer, and be provided a mechanism to capture the various style information in that layer.

At block 430, at least one style option is identified. The style option is determined by the style information item. For example, if a portion of the document has multiple colors associated with the portion, a style option can identified for the multiple colors.

At block 440, a selection of the style option is received. For example, the at least one style option can be a button corresponding to a style type of the at least one style information item. As another example, if a block of text is selected in the document, style options for character type, color, and text effects can be provided. If an image is selected in the document, style options for the image and image effect can be provided.

At block 450, the style information item is stored in a centrally stored library that is shared between multiple applications and/or devices. In some embodiments, a style type is determined for the style information item. The style information item is stored as multiple representations in the centrally stored library. For example, the first application may determine variations of the style information based on the style type and send the style information to the centrally stored library as multiple representations of the style type. Each of the multiple representations may correspond to one of the variations of the style information. For example, a color may have RGB, CMY(K), HSL, YUV, YCbCr, and YPbPr as variations of a color style. Thus, a color may be stored as RGB, CMY(K), HSL, YUV, YCbCr, and YPbPr representations.

Instead of displaying all of the multiple representations in a local library client, the multiple representations of the style information item are displayed as a single library item. For example, the multiple representations of the style information may be visible as a single library item in the local library client of the second application. In some embodiments, for a style type unsupported by the second application, the visibility of the style information may be obscured in the second application. The second application may use a complementary representation of the style type, where one of multiple representations is stored as the complementary representation of the style type. In some embodiments, the multiple representations may include a primary representation, the primary representation corresponding to a representation with a highest level of detail, and at least one rendition representation, the at least one rendition representation corresponding to a complementary representation of the primary representation. In some embodiments, the style information may only have one representation. The second application may use a complementary representation of the style type, where the complementary representation is not stored in the centrally stored library. Thus, the library storage service may create the complementary representation of the style type usable by the second application. Alternatively, the second application may receive the representation of the style information, and generate a complementary representation for use by the second application. Thus, the user need not know of the multiple representations and format types, and can just use the style information item.

In some embodiments, the style information item is stored in a manifest file, where the manifest file references the multiple representations. The manifest file may have tags or labels identifying the style information and the multiple representations of the style information. For example, the contents of one or more of the multiple representations may be stored as a series of key-value pairs, which may be stored as part of the manifest file or in a separate file. Thus, the style information item can appear as a single item to the user. The user need not know of how the multiple representations are stored in the centrally stored library or what formats the multiple representations are in. Thus, as with the local library client, the storage of the style information is obscured from the user, so that the user need not worry about the storage details and can just use the style information.

These configurations provide for easy storage and interchangeability of style information between applications and devices. By providing easy storage and interchangeability of style information, a user may freely use the style information in different applications and on different devices with the assurance that the style information will be compatible with the application. Furthermore, the style information can be in a format with a high level of detail without having to create the compatible version of the style information separately, allowing for effective management of style information.

Figure 5:
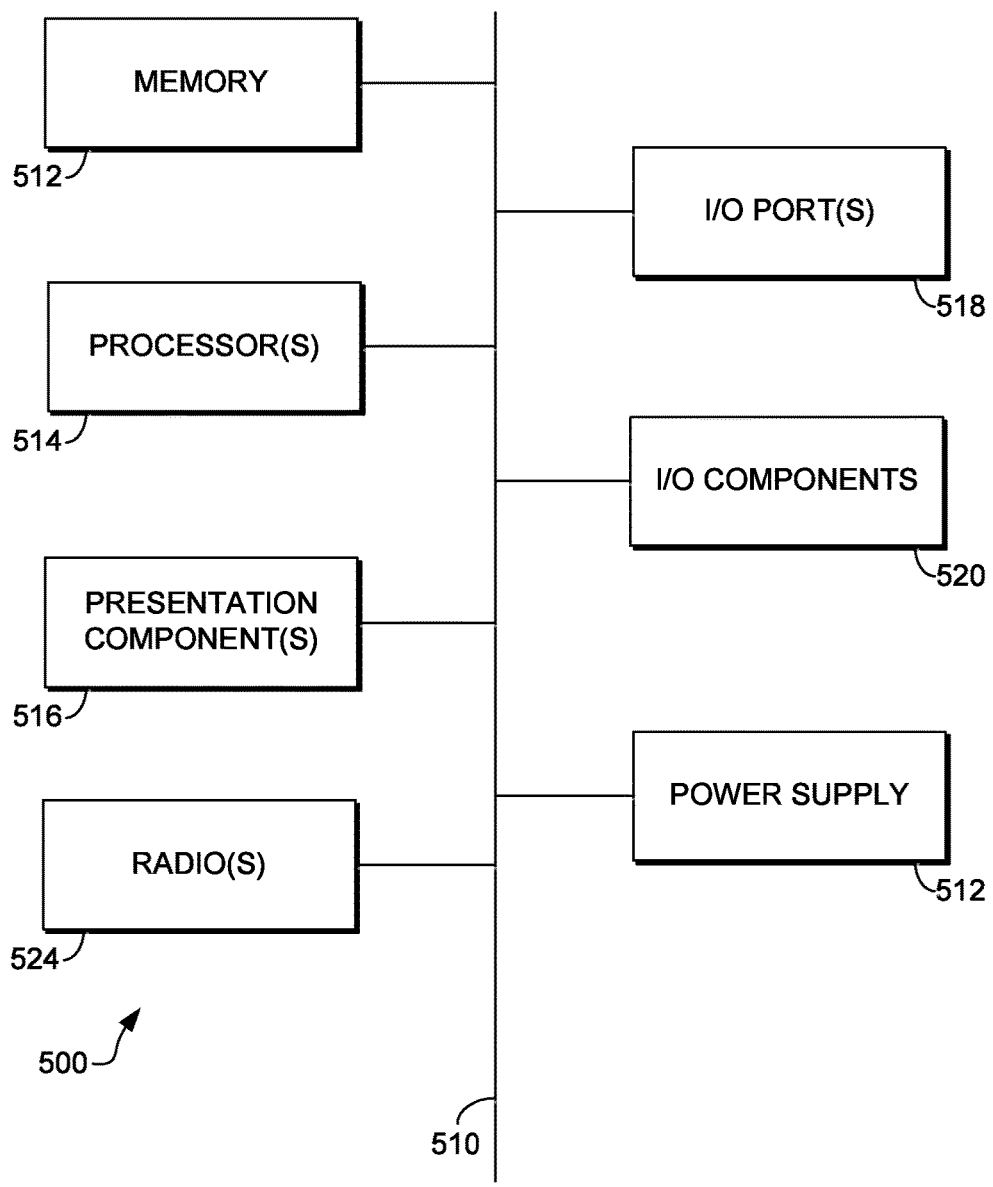
FIG. 5 is a block diagram illustrating an exemplary computing environment suitable for use in implementations of the present disclosure.

An exemplary operating environment in which embodiments of the present invention may be implemented is described below in order to provide a general context for various aspects of the present invention. Referring initially to FIG. 5 in particular, an exemplary operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the invention may be practiced in a variety of system configurations, including handheld devices, consumer electronics, general-purpose computers, specialty computing devices, etc. Aspects of the invention may also be practiced in distributed computing environments where tasks are performed by remote-processing devices that are linked through a communications network.

With reference to FIG. 5, computing device 500 includes a bus 510 that directly or indirectly couples the following devices: memory 512, one or more processors 514, one or more presentation components 516, input/output (I/O) ports 518, I/O components 520, and an illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component 520. Also, processors have memory. The inventors hereof recognize that such is the nature of the art, and reiterate that the diagram of FIG. 5 is merely illustrative of an exemplary computing device that can be used in connection with one or more aspects of the invention. Distinction is not made between such categories as "workstation," "server," "laptop," "handheld device," etc., as all are contemplated within the scope of FIG. 5 and refer to "computer" or "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer-storage media in the form of volatile and/or nonvolatile memory. The memory 512 may be removable, nonremovable, or a combination thereof. Exemplary memory includes solid-state memory, hard drives, optical-disc drives, etc. Computing device 500 includes one or more processors 514 that read data from various entities such as bus 510, memory 512 or I/O components 520. Presentation component(s) 516 present data indications to a user or other device. Exemplary presentation components 516 include a display device, speaker, printing component, vibrating component, etc. I/O ports 518 allow computing device 500 to be logically coupled to other devices including I/O components 520, some of which may be built in.

Illustrative I/O components include a microphone, joystick, game pad, satellite dish, scanner, printer, display device, wireless device, a controller (such as a stylus, a keyboard and a mouse), a natural user interface (NUI), and the like. In embodiments, a pen digitizer (not shown) and accompanying input instrument (also not shown but which may include, by way of example only, a pen or a stylus) are provided in order to digitally capture freehand user input. The connection between the pen digitizer and processor(s) 514 may be direct or via a coupling utilizing a serial port, parallel port, and/or other interface and/or system bus known in the art. Furthermore, the digitizer input component may be a component separated from an output component such as a display device or, in some embodiments, the usable input area of a digitizer may be co-extensive with the display area of a display device, integrated with the display device, or may exist as a separate device overlaying or otherwise appended to a display device. Any and all such variations, and any combination thereof, are contemplated to be within the scope of embodiments of the present invention.

A NUI processes air gestures, voice, or other physiological inputs generated by a user. Appropriate NUI inputs may be interpreted as ink strokes for presentation in association with the computing device 500. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as, stereoscopic camera systems, infrared camera systems, RGB camera systems, and combinations of these for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

A computing device may include a radio. The radio transmits and receives radio communications. The computing device may be a wireless terminal adapted to received communications and media over various wireless networks. Computing device 500 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is second example of a short-range connection. A long-range connection may include a connection using one or more of CDMA, GPRS, GSM, TDMA, and 802.16 protocols.

Accordingly, embodiments of the invention may be described in the general context of computer-executable instructions, such as program modules, being executed by a computer. Generally, program modules include routines, programs, objects, components, data structures, etc., that perform particular tasks or implement particular abstract data types. The embodiments may also be practiced in distributed computing environments or cloud environments where tasks are performed by remote-processing devices that are linked through a communications network. In a distributed computing environment, program modules may be located in both local and remote computer storage media including memory storage devices.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

Aspects of the invention have been described to be illustrative rather than restrictive. It will be understood that certain features and subcombinations are of utility and may be employed without reference to other features and subcombinations. This is contemplated by and is within the scope of the claims.

What is claimed is:

1. A computer-implemented method, comprising:
   causing a part of a document to be presented in a first part of a graphical user interface, the part of the document including a user-selectable portion having two style information items;
   in response to the user-selectable portion being selected, causing display of at least two menu items in a second part of the graphical user interface, the at least two menu items being configured to represent respective style information of the two style information items; and
   in response to one of the at least two menu items being selected, storing style information of one of the two style information items in the user-selectable portion to a library.

2. The method of claim 1, wherein the storing comprises:
   automatically determining a style type for the one of the two style information items; and
   storing the one of the two style information items as multiple representations, the multiple representations corresponding to one or more variations of the style type.

3. The method of claim 1, wherein causing display comprises:
   causing display of a first menu item and a second menu item that correspond with a first style information item of the two style information items; and
   causing display of a third menu item and a fourth menu item that correspond with a second style information item of the two style information items.

4. The method of claim 1, further comprising:
   in response to a user selecting another user-selectable portion, changing menu items in a menu, the menu items being determined based on the selected another user-selectable portion.

5. The method of claim 1, further comprising:
   cause display of a local library client in the graphical user interface, the local library client including a library of style information items as a local library, wherein one of the library of style information items is selectable to be applied to the user-selectable portion.

6. The method of claim 5, further comprising:
   cause display of the one of the library of style information items in the local library client.

7. The method of claim 5, wherein the local library comprises at least one of color, character style, layer style, and graphic style types.

8. The method of claim 5, wherein the local library is one of a plurality of selectable libraries of style information items available to a user.

9. The method of claim 5, wherein the local library client displays the stored style information.

10. The method of claim 1, further comprising:
    displaying a symbol of the one of the two style information items in a local library client of a second application;
    in response to a user selecting the symbol of the at least one of the two style information items, applying information of the one of the two style information items to at least a portion of another document in the second application.

11. The method of claim 10, further comprising, when the one of the two style information items is not compatible with the second application,
    providing a representation of the one of the two style information items that is compatible with the second application; and
    applying the representation of the one of the two style information items in the second application.

12. The method of claim 1, further comprising:
    when the one of the two style information items is not compatible with a second application, obscuring the one of the two style information items in a local library client of the second application.

13. The method of claim 1, wherein the user-selectable portion is a layer of the document.

14. A non-transitory computer-readable medium, comprising computer-implemented instructions that, when used by one or more computing devices, cause the one or more computing devices to:
    receive a selection of a portion of a document displayed in a graphical user interface;
    determine two style information items and their respective style information from the portion of the document; and
    in response to a selection of a user interface element representing one of the two style information items on the graphical user interface, store style information of the one of the two style information items in a library via a computing cloud service.

15. The computer-readable medium of claim 14, wherein storing the style information comprises storing multiple representations of the one of the two style information items.

16. The computer-readable medium of claim 15, wherein the multiple representations of the one of the two style information items are displayed as a single library item in a local library client of a second application.

17. The computer-readable medium of claim 15, wherein storing the style information further comprises:
  storing the style information of the one of the two style information items in a manifest file, wherein the manifest file references the multiple representations.

18. The computer-readable medium of claim 15, wherein the multiple representations comprise key-value pairs for the one of the two style information items.

19. A system, comprising:
  a first application component comprising a first local library client, the first application component configured to:
    receive a selection of a portion of a document and an indication of a style information type for the selected portion of the document;
    determine style information corresponding to the selected style information type indicated for the selected portion of the document; and
    send the style information to a first local library; and
  a library storage service component, coupled to the first application component, configured to receive the style information from the first local library and store the style information as multiple representations in a shared library.

20. The system of claim 19, further comprising:
  a second application component comprising a second local library client, the second application component configured to:
receive the style information from the shared library; and
in response to the style information being supported by the second application component, provide the style information in the second local library client of the second application component for use in a second application associated with the second application component.

* * * * *